United States Patent
Popp et al.

(10) Patent No.: US 10,769,782 B2
(45) Date of Patent: Sep. 8, 2020

(54) METHOD, COMPUTER-ACCESSIBLE MEDIUM AND SYSTEM FOR PROVIDING PROPERTY MEASUREMENT ON A BIOLOGICAL TISSUE SAMPLE

(71) Applicants: Leibniz-Institut für Photonische Technologien e.V., Jena (DE); Friedrich-Schiller-Universität Jena, Jena (DE)

(72) Inventors: Jürgen Popp, Jena-Kunitz (DE); Thomas Bocklitz, Jena (DE); Olga Chernavskaia, Jena (DE); Tobias Meyer, Jena (DE)

(73) Assignees: Leibniz-Institut für Photonische Technologien e.V., Jena (DE); Friedrich-Schiller-Universität Jena, Jena (DE)

( * ) Notice: Subject to any disclaimer, the term of this patent is extended or adjusted under 35 U.S.C. 154(b) by 162 days.

(21) Appl. No.: 16/062,340

(22) PCT Filed: Dec. 13, 2016

(86) PCT No.: PCT/IB2016/057575
§ 371 (c)(1),
(2) Date: Jun. 14, 2018

(87) PCT Pub. No.: WO2017/103784
PCT Pub. Date: Jun. 22, 2017

(65) Prior Publication Data
US 2018/0365831 A1 Dec. 20, 2018

(30) Foreign Application Priority Data
Dec. 17, 2015 (EP) .................................. 15200864

(51) Int. Cl.
*G06K 9/00* (2006.01)
*G06T 7/00* (2017.01)

(52) U.S. Cl.
CPC .. *G06T 7/0012* (2013.01); *G06T 2207/10056* (2013.01); *G06T 2207/30024* (2013.01); *G06T 2207/30028* (2013.01)

(58) Field of Classification Search
CPC ......... G06T 7/0012; G06T 7/11; G06T 7/143; G06T 7/33; G06T 7/41;
(Continued)

(56) References Cited

U.S. PATENT DOCUMENTS

| 8,712,142 B2 | 4/2014 | Rajpoot et al. | |
| 2011/0122488 A1* | 5/2011 | Truong | G01N 21/6408 359/385 |

(Continued)

FOREIGN PATENT DOCUMENTS

WO    WO 2014/147416    9/2014

OTHER PUBLICATIONS

Anna Medyukhina et al., "Towards automated segmentation of cells and cell nuclei in nonlinear optical microscopy", Journal of Biophotonics, vol. 5, No. 11-12, Nov. 1, 2012 (Nov. 1, 2012), pp. 878-888. (Year: 2012).*

(Continued)

*Primary Examiner* — Jose L Couso
(74) *Attorney, Agent, or Firm* — Hunton Andrews Kurth LLP

(57) ABSTRACT

Exemplary method, computer-accessible medium and system can be provided for determining the presence or absence of a local and/or global property of a biological tissue sample. Thus, it is possible to obtain at least one image of the sample, search the image(s) for a presence of at least one particular feature that is contained in a pre-defined set of (Continued)

features, and assign, to the particular feature(s). It is possible to compute, with a computer processor, at least one discriminant value that is a function of the pronunciation index that is weighted with a particular weight. The weight of each pronunciation index is a measure for a relevance of the corresponding feature with respect to the property. It is possible to determine whether the property is present in at least one part of the biological tissue sample depending on whether the discriminant value exceeds a pre-defined threshold and/or and optimized threshold.

21 Claims, 7 Drawing Sheets

(58) Field of Classification Search
CPC . G06T 2207/10056; G06T 2207/30024; G06T 2207/30028; G06T 2207/30016; G06T 2207/30096; G06T 2207/30204; G06T 2207/10061; G06T 2207/30072; G06K 9/0014; G06K 9/00127; G06K 9/00147; G06K 9/342; G06K 9/4671; G06K 9/4676; G06K 9/6267; G06K 9/6282; G06K 9/6292; G06K 2209/07; G06K 2209/403; G01J 3/027; G01J 3/28; G01J 3/44; G01J 3/02; G01J 3/0218; G01N 21/6408; G01N 21/6458; G01N 21/6486; G01N 21/65; G01N 21/636; G01N 21/64; G01N 2021/6417; G01N 2021/653; G01N 2021/655; G01N 2800/7028; G01N 33/4833; G01N 35/00; G01N 2015/0065; G02B 21/002; G02B 21/365; G02B 21/16; G06F 16/285; G06F 16/24578; G06F 19/00; G16B 20/00; G16B 25/00; G16B 40/00; G16B 50/00; A61B 8/085; A61B 8/48; A61B 5/0066; A61B 5/0068; A61B 5/441; A61B 1/00165; A61B 1/043; A61B 3/0008; A61B 3/18; A61B 6/037; A61B 6/4258; A61B 6/508; A61B 2090/3937; A61B 2090/3954; A61B 2090/3995; A61B 2090/392; A61B 90/39
See application file for complete search history.

(56) References Cited

U.S. PATENT DOCUMENTS

| | | | | |
|---|---|---|---|---|
| 2011/0261349 | A1* | 10/2011 | Cheng | G01J 3/44 356/72 |
| 2011/0282166 | A1* | 11/2011 | Chen | A61B 5/0084 600/306 |
| 2013/0149734 | A1* | 6/2013 | Ammar | G01N 21/6408 435/29 |
| 2016/0238532 | A1* | 8/2016 | Freudiger | G01N 21/6402 |
| 2017/0248518 | A1* | 8/2017 | Nadkarni | G01N 21/4788 |
| 2018/0246309 | A1* | 8/2018 | Brown | H04N 1/17 |
| 2018/0263606 | A1* | 9/2018 | Orringer | G01J 3/44 |
| 2018/0270474 | A1* | 9/2018 | Liu | G06K 9/00201 |
| 2019/0049354 | A1* | 2/2019 | Nadkarni | G01N 15/0227 |

OTHER PUBLICATIONS

International Written Opinion for International Application No. PCT/IB2016/057575 dated Aug. 3, 2017.
International Search Report for International Application No. PCT/IB2016/057575 dated Aug. 3, 2017.
Donalek Ciro et al. "Feature selection strategies for classifying high dimensional astronomical data sets," IEE Intern. Conf. on Big Data, pp. 35-41 (Oct. 6, 2013).
International Preliminary Report on Patentability dated Jun. 19, 2018 for PCT/IB2016/057575.
Extended European Search Report dated Jul. 5, 2016 for European Patent Application No. 15200864.5.
Q. Dang Vu et al., "Methods for Segmentation and Classification of Digital Microscopy Tissue Images," Frontiers in Bioengineering and Biotechnology, vol. 7, Article 53, pp. 1-15 (Apr. 2019).
A. Medyukhina et al., "Towards automated segmentation of cells and cell nuclei in nonlinear optical microscopy," Journal of Biophotonics 5, No. 11-12, pp. 878-888 (2012).
European Office Action for European Patent Application No. 15 200 864.5 dated Dec. 20, 2019.
Response to European Office Action for European Patent Application No. 15 200 864.5 filed on Mar. 30, 2020.
R. Farjam et al., "An Image Analysis Approach for Automatic Malignancy Determination of Prostate Pathological Images," Clinical Cytometry Society, 72B, pp. 227-240 (2007).
J. Mansfield et al., "LDA-Guided Search Engine for the Nonsubjective Analysis of Infrared Microscopic Maps," Applied Society for Applied Spectroscopy, vol. 53, pp. 1323-1330 (Nov. 11, 1999).
S. Heuke et al., "Multimodal nonlinear microscopy of head and neck carcinoma—towards surgery assisting frozen section anaylsis," pp. 2-20.
J.P. Vink et al., "Efficient nucleus detector in histopathology images," Journal of Microscopy, vol. 249, pp. 124-135 (2012).
F. Legesse et al., "Texture analysis and classification in coherent anti-Stokes Raman scattering (CARS) microscopy images for automated detection of skin cancer," Computerized Medical Imaging and Graphics, 43, pp. 36-43 (2015).
T. Meyer et al., "Multimodal nonlinear microscopic investigations on head and neck squanmous cell carcinoma: Toward intraoperative imaging," Head and Neck, pp. E280-E287, (Sep. 2013).
Communication pursuant to Article 94(3) EPC dated Dec. 20, 2019 for European application No. 15200864.5.

* cited by examiner

METHOD, COMPUTER-ACCESSIBLE MEDIUM AND SYSTEM FOR PROVIDING PROPERTY MEASUREMENT ON A BIOLOGICAL TISSUE SAMPLE

CROSS REFERENCE TO RELATED APPLICATION(S)

This application relates to, and claims the benefit and priority from International Patent Application No. PCT/IB2016/057575 filed on Dec. 13, 2016 that published as International Patent Publication No. WO 2017/103784 on Jun. 22, 2017, which claims the benefit and priority from European Patent Application No. 15200864.5 filed on Dec. 17, 2015, the entire disclosures of which are incorporated herein by reference in their entireties.

FIELD OF THE DISCLOSURE

The present disclosure relates to method, computer-accessible medium and system for determining presence or absence of a local property and/or a global property of a biological tissue sample.

BACKGROUND OF INFORMATION

Microscopic techniques are important tools for determining the presence or absence of a local property and/or a global property of a biological tissue sample. Such techniques can produce images that are immediately interpretable by the user. Large areas of the sample can be examined quickly. At the same time, it is possible to zoom in to a level that resolves details of biological cells. Therefore, the user can, for example, determine very easily that the sample does not look normal.

When a hard determination is required as to whether a local property and/or a global property is present in the sample, the processing of the microscopic images by the user becomes a bottleneck. For example, the examination of histological samples for features that may indicate a disease relies on highly trained and experienced pathologists. The assessment is time-consuming and depends in part on the person who evaluates the images: two different experts may rate one and the same image of a sample differently with respect to the desired property.

Certain publications (for example, T. Meyer, O. Guntinas-Lichius, F. von Eggeling, Gil. Ernst, D. Akimov, M. Schmitt; B. Dietzek & Jü. Popp, "Multimodal nonlinear microscopic investigations on head and neck squamous cell carcinoma: Toward intraoperative imaging", Head & Neck, Wiley Online Library, 35, E280-E287 (2013)) and (F. B. Legesse, A. Medyukhina, S. Heuke & J. Popp, "Texture analysis and classification in coherent anti-Stokes Raman scattering (CARS) microscopy images for automated detection of skin cancer", Computerized Medical Imaging and Graphics, 43, 36-43 (2015)) demonstrate the principle for determining a property (cancerous tissue) based on coherent anti-Stokes Raman scattering, CARS, image, and/or a two-photon excited auto fluorescence, TPEF, image, and/or a second-harmonic generation, SHG, image, and/or the image that results from a multimodal combination of the three images.

However, the computational complexity can be too high for a fast screening, and neither an automatic prediction nor an automatic comparison with a gold standard or reference method has been provided.

OBJECTS OF EXEMPLARY EMBODIMENTS

It is therefore one of the objects of the present disclosure to accelerate and objectify the determination of whether a certain local property and/or a certain global property is present or absent in a biological tissue sample or parts of it.

This exemplary object can accomplished by a method according to an exemplary embodiment of the present disclosure. Further advantageous exemplary embodiments of the present disclosure are also described herein.

SUMMARY OF EXEMPLARY EMBODIMENTS

To that end, a method according to an exemplary embodiment of the present disclosure can be provided. For example, such exemplary method can comprise the following procedures/steps, which may be carried in the following order, and also in various different orders:

acquiring an image of the sample, searching the image for the presence of each feature that can be contained in a pre-defined set of features, assigning, to at least one feature, a corresponding pronunciation index that is a measure of how pronounced each feature is in the image or parts of it, computing at least one discriminant value, e.g. a linear discriminant value LD, that can be a non-linear function of the weighted pronunciation indices, wherein the weight of each pronunciation index is a measure for the relevance of the corresponding feature with respect to the property, and determining that the property is present or absent in the sample or part of it depending on whether the discriminant value exceeds a pre-defined and/or optimized threshold.

The discriminant value may be a linear function of the weighted pronunciation indices, which is fast and easy to compute. Such exemplary value may also be a non-linear function of the weighted pronunciation indices to account for more complex relationships between the pronunciations of features and the presence or absence of a property.

According to another exemplary embodiment of the present disclosure, the image may be a microscopic image, and the exemplary method is not tied to how the image has been acquired. The image may also be, for example, a conventional photograph, an ultrasonic image, an x-ray image or a tomographic image. For example, with respect to the image acquisition, the presence or absence of the property in question produces a contrast or morphological/texture changes within the image.

According to yet another exemplary embodiment of the present disclosure, the task of assessing whether the property is present or absent in the sample can be divided into certain exemplary procedures/steps. For example, each of these exemplary procedures/steps on their own can be objectified and/or machine-implemented. As one example, for the performance of each procedure/step on its own, existing machine-based techniques can be implemented. The combination of most or all procedures/steps can then be implemented by machine as well, so that the presence or absence of the property no longer subjectively depends on the user.

The exemplary method can operate with an understanding that the property in question would manifest itself in at least one feature in the acquired image. In various settings where a property of a biological sample is investigated, there would likely be two or more features in the acquired image that will be influenced by the property in question. To that end, e.g., the assessment whether the property is present or absent basically would depend on, e.g., two or more factors, i.e., how strongly the feature is pronounced in the image on the one hand, and how meaningful the feature is for the presence or absence of the property on the other hand.

After the image has been, acquired, it may be subject to any suitable kind of pre-processing before the detection of features starts. For example, the image may be standardized based on its background level or foreground level, and/or it may be corrected for measuring artifacts, such as uneven illumination.

Given an image and a specific feature, it is possible and practical (according to exemplary embodiments of the present disclosure) to determine how pronounced the feature is in the image or in a part of the image, and assign a pronunciation index accordingly. Any exemplary technique from the field of image analysis may be used for this purpose, including, but not limited to, e.g., histogram-based techniques, correlation-based techniques or wavelet analysis. For example, the used features can be rotationally symmetric in order to facilitate a determination which can be independent of the image acquisition orientation. To accelerate the detection of features, the pronunciation index may be computed at some sampling points in the image, and then interpolated in the area between these sampling points. This is not possible with the features Gray-level-co-occurrence matrix used in previous publications. The possibility to interpolate the pronunciation index brings about a speed gain that is highly desirable for clinical use or other fast screening examinations of tissue.

Using the exemplary pronunciation indices as the feedstock to determine the presence or absence of the property brings about the additional advantages that the pronunciation indices are tied to human-interpretable features, so their values can be construed to be physical measurement quantities that make sense on their own. The pronunciation indices may be statistical quantities; further, since they are backed by interpretable physical measurement quantities, they can remain interpretable. Additionally, a Gray-level-co-occurrence matrix is a pure statistical quantity that has been abstracted from the actual physical measurement data by multiple processing procedures/steps.

While the determination of the pronunciation index can be automatic, it may be aided by training using expert knowledge. For example, a human expert may label the feature manually on a set of training images, and parameters of the detection algorithm for this particular feature may be optimized for best correspondence of the automatic detection with the manual labeling in all training images. According to a further exemplary embodiment of the present disclosure, the automatic detection of crypt regions can be trained in such exemplary manner so that each crypt region could subsequently be recognized as a separate segment. The determination of the pronunciation index may also be complemented by visual inspection of the image in a way that the user pre-selects areas where features are to be detected. For example, an area where to look for crypts may be pre-selected or may be determined automatically.

For example, a feature may be present multiple times in the image. The pronunciation index of the feature may then, for example, be averaged over all occurrences of the feature in the image. The pronunciation index may also be set to the maximum value over all occurrences of the feature in the image. The latter may be useful as a fail-safe approach for the identification of red flag areas, RFA, on the sample that are to be investigated further using additional physical measurements.

To derive the presence or absence of the property in the sample from the pronunciation of the individual features in the image, a discriminant can be used. A discriminant can be a function that depends on the pronunciation indices of the individual features as variables and maps a set of pronunciation indices to a discriminant value. What gives the discriminant its exemplary name is that the determination whether the property is present or absent in the sample can be done by comparing the discriminant value with a predefined and/or optimized threshold. If the discriminant value exceeds the threshold, it is determined that the property is present in the sample or parts of it. If the discriminant value does not exceed the threshold, it can be determined that the property is not present in the sample or parts thereof. Thus, by its value, the discriminant can distinguish (or discriminate) the samples or areas into two classes: samples or areas where the property in question is present on the one hand, and samples or areas where this property is absent on the other hand.

The determination as to whether the property is present in the sample or parts thereof can include the possibility to discriminate the samples into more than two classes, so that not only the presence or absence of one single property can be determined, but it can be determined which one of several possible properties is present. For example, it is possible to determine whether some biological tissue is in a normal state or not, also different types of tissue may be discriminated from one another. To this end, for example, multiple ranges for the discriminant value may be defined, as well as a single threshold, or a set of discriminant values, e.g., a discriminant vector comprising several discriminant values, all of which may be used. In response to the discriminant value and/or vector being in a specific range, it may be determined that one specific of the several possible properties is present in the sample.

A pixel-wise classification in order to determine the property locally may not be possible within the frame work of the previous publications cited above, because the utilized features described therein may not be interpolated, and the computational complexity is too high.

A pixel-wise classification of tissue in the image may be converted into a determination whether a property, such as cancer, is present or absent in the sample. For example, cancer may be predicted if cancerous tissue is found in more than a certain percentage, e.g., 5%, of the image pixels and/or in certain connected areas.

In an exemplary case where the presence or absence of the property is determined on the basis of one single feature, the pronunciation index of this feature can be used directly as the discriminant. For most properties of interest in biological tissue samples, no single feature that facilitates an unequivocal determination whether the property is present or absent in the sample exists. Instead, the property may be determined on the basis of a plurality of features, where the pronunciation of each feature has some degree of correlation with the property being present or absent in the sample. This degree of correlation may vary among the features comprised in the set of features. Certain examples for complex properties that can likely be assessed on the basis of multiple features are inflammation, lesions and cancerous modifications of tissue. A suitable discriminant the value of which can be used to distinguish whether such a property is present or absent in the sample may pool the pronunciation indices of the individual features by assigning a weight to each feature. This exemplary weight can be used to determine how strongly a change in the pronunciation index of a feature will impact the discriminant value. It is a measure for the relevance of the feature with respect to the property in question.

For example, the individual features may be seen as members of a company board in a meeting, and their pronunciation indices correspond to their votes for or against the presence of the property in question. The discriminant can correspond to the chairman of the meeting and delivers the final ruling about the presence or absence of the property based on all votes that he can discern from the din of all the members talking at the same time. The pronunciation index of an individual feature can correspond to how well the chairman can discern what a particular member is saying, while the weight of the feature can correspond to how much of an impact this exemplary member has in the matter being decided, e.g., owing to the percentage of the shares in the company held by the member.

The weighted function may, for example, be a linear discriminant. It may then be a weighted sum of the individual pronunciation indices. For example, the dependence of the discriminant value on the individual pronunciation indices may also be more complex, depending on the property in question. A linear discriminant can have an advantage that it is easier to compute, and that the weights of the individual features are the only parameters that should be set to calculate the discriminant value. The concept of a classification based on a (e.g., Fisher's) linear discriminant is to find the optimal linear combination of variables that maximized the variations between different classes and minimizes variation within these classes.

The exemplary set of features in which the property in question may manifest itself at all is known to the skilled person who is given the task to investigate the presence or absence of this property in the sample.

The weights may, for example, be acquired by training the method with a set of training images. A training image can be an image that has been rated by a human expert, or by any other "gold standard" reference method, for which the presence or absence of the property in question is shown in this reference image. Each training image can be searched for the presence of each feature from said set of features, and corresponding pronunciation indices are determined as mentioned above in an objective way. Given a sufficient number of training images, a trend can emerge how strongly the pronunciation of each feature is correlated with the presence or absence of the property. This degree of correlation may be used as a weight assigned to the feature and its pronunciation index. Thus, the "gold standard", which may exist in the form of training and experience of a human expert, may be objectified and quantitatively recorded in the form of the weights, and a suitable discriminant may be composed of features selected as relevant for the problem at hand by means of statistical modeling. If the training has been performed for a particular set of features and a particular property, another user of the method in the same setting can re-use the weights. For example, after the training has been performed once, any number of devices or computer program products that embody the method can be fabricated with the weights pre-set to those acquired by this one, single training.

Therefore, in a further exemplary embodiment of the present disclosure, the method can further comprise obtaining the weight associated with at least one feature by, e.g.:
acquiring a plurality of training images of training samples;
searching the plurality of training images for the presence of the feature, and for each training image, computing a pronunciation index that is a measure of how pronounced the feature is in the training image or parts thereof;
acquiring reference information whether the property is present in the training samples;
computing the correlation between the value of the pronunciation index and the presence or absence of the property in the training samples or parts of it; and
setting the weight to the value of said correlation.

The exemplary training mat not be the only method by which the weights may he acquired. If, for example, a physical, biological, and/or chemical interaction mechanism is known that links the property to the pronunciation of certain features, this may be used to set or to refine the weights.

Weights may, for example, be normalized to a range between +1 and −1. If, for example, all training images in the set of training images that show a certain feature have been rated to show the presence of the property in question by the "gold standard", then this exemplary feature may be accorded the highest weight of +1. If, on the other hand, all training samples from the set of training samples that show the feature have been rated as showing the absence of the property in question, the feature may be accorded the opposite weight of −1. If the occurrence of the feature is completely or mostly uncorrelated to the training sample showing the presence or absence of the property, then the exemplary feature may be assigned a weight of 0, so that its detection in the acquired image has no bearing on the determination whether the property is present or absent. If the pronunciation of the feature is an indication, but not a sufficient condition, for the presence or absence of the property, then the exemplary feature may be accorded an intermediate weight, e.g., 0.2. Another possibility can be the implementation of a statistical normalization of the weights.

Therefore, in yet another exemplary embodiment of the present disclosure, the weight associated with a feature can be a measure for the correlation between the pronunciation of this feature and the presence of the tested property in the sample or parts thereof.

The statistical nature of the training advantageously makes the exemplary method resilient against any imperfections in a machine-based detection of features in images. If a feature cannot be reliably detected, for example, due to image noise foiling the detection algorithm, it can become uncorrelated with the presence of the property, and the weight of the feature will move towards 0.

It can be advantageous if the searching of the image for the presence of the feature, and thus the determination of the pronunciation index, is automatic without human intervention. A human likely may not strictly distinguish between the pronunciation of the feature in the image on the one hand and the correlation of this feature to the presence of the property on the other hand. For example, the mind of an experienced pathologist would likely be sharpened to detect features that are strong signs for cancer. If such a feature is only faintly pronounced in the image, the pathologist will already be alarmed and lock on to this feature. The pathologist may then completely overlook a feature that is shown much better in the image, but is only a much weaker sign for cancer. Thus, there may likely be a crosstalk between the pronunciation index and the weights. The reliability of the method is best if this crosstalk is avoided.

In an additional exemplary embodiment of the present disclosure, the image can be one or more of a coherent anti-Stokes Raman scattering, CARS, image, a two-photon excited auto fluorescence, TPEF, image, or a second-harmonic generation, SHG, image, and/or the image is a multimodal combination of two or three of a CARS image, a TPEF image, or an SHG image. Alternatively or in combination, the image may also be a multimodal combination of two, three or four of a coherent anti-Stokes Raman scattering, CARS, image, a two-photon excited auto fluorescence, TPEF, image, a second-harmonic generation, SHG, image, and a stimulated raman spectroscopy, SRS, image.

For example, CARS imaging may be performed at the Raman resonance of wavenumber 2850 $cm^{-1}$ so that mainly $CH_2$-rich lipids yield a pronounced signal, while the signal originating from proteins is weaker. If CARS imaging is performed at the Raman resonance of wavenumber 2930 $cm^{-1}$, it is sensitive both to $CH_2$-rich lipids and to $CH_3$-rich proteins.

CARS2850 maps the distribution of methylene groups—which are abundant in lipids—by visualizing the symmetrical stretching (SymS) vibration of $CH_2$. For CARS2930, i.e. images at the Raman resonance at 2930 $cm^{-1}$, the molecular interpretation is more sophisticated. Various aliphatic Raman bands overlap around 2930 $cm^{-1}$, such as the Fermi resonances (FR) (~2905 $cm^{-1}$, ~2918 $cm^{-1}$, ~2954 $cm^{-1}$) of $CH_2$, the FR (~2934 $cm^{-1}$) of $CH_3$ and the SymS vibration (~2920 $cm^{-1}$) of CH. For example, the aliphatic contribution from non-methylene groups rises in CARS2930 as compared to CARS2850. Thus, CARS2930 favors proteins in comparison to CARS2850 as proteins possess a lower ratio of $CH_2$ to ($CH_3$+CH) groups compared to lipids.

TPEF imaging may, for example, be configured for the spectral range between 426-490 nm, particularly for the wavelength 458 nm, highlighting the distribution of strong auto-fluorophores such as elastin, NAD(P)H and keratin, as well as collagen. TPEF imaging may also be configured for the spectral range between 503-548 nm, particularly for the wavelength 525 nm, to highlight flavines, elastin, as well as collagen. Since the excitation wavelengths for TPEF458 and TPEF525 are nearly identical and the spectral fluorescence emission spectrum is broad, both TPEF channels collect signal of the same endogenous fluorophores. The most prominent autofluorophores of the human intestine are-likely elastin, collagen, NAD(P)H and flavins. Due to the distinct spectral windows imaged by TPEF458 and TPEF525, the fluorophores can appear with different relative signal contributions within each channel which is most pronounced for NAD(P)H and flavins. While NAD(P)H possesses a peak emission at 465 nm that is collected mostly by TPEF458, fluorescence photons arising from flavins centered around 530 nm are collected more efficiently by TPEF525. Thus, TPEF458 and TPEF525 likely complement each other for their ability to visualize areas of high NAD(P)H and flavins concentrations which is in fact the major reason for imaging every sample twice. Note, however, that a multimodal microscope is readily constructed that is able to collect both TPEF channels at once.

CARS and TPEF can be complemented by SHG revealing the location of non-centrosymmetric structures. Therefore, for tissue sections of the intestinal tract, for example, SHG localizes the fibrous structures, like collagen networks. SHG imaging may, for example, be configured to a wavelength around 415 nm to map collagen rich structures.

A multimodal combination can join molecular contrast with subcellular resolution and is very intuitive to interpret because different kinds of information about one and the same area of the sample may be blended together in one and the same place in the image. For example, a visual evaluation of images can indicate that multimodal images are capable to display major indicators of an inflammation such as for example crypt distortions, rupture of topmost epithelial layer, thickening of the basement membrane and scarring of the mucosa. A detection of inflammation by the method according to the exemplary embodiments of the present disclosure can, for example, be used as a tool for the real-time evaluation of inflammatory bowel disease, IBD, on a microscopic level. Acquisition and evaluation of multimodal images on one patient can take 5-10 minutes, which is fast enough for providing a direct diagnosis to assist in a clinical decision making. Specifically, during a surgery, frozen sections of tissue may be examined quickly ex-vivo, ex-corpore-in-vivo and/or in-vivo.

For example, the multimodal image can be considered a superposition of sub-images acquired with different imaging technique, with each sub-image contributing a different color to an additive mix, where the contribution of the sub-image to each pixel of the multimodal image has a brightness corresponding to the intensity value of this pixel in the respective sub-image. The multimodal image may be a superposition of shades of green with a brightness corresponding to the intensity values of a TPEF image, shades of red with a brightness corresponding to the intensity values of a CARS image, and shades of blue with a brightness corresponding to intensity values of a SHG image.

It can be advantageous to determine whether a specific kind of tissue is present and/or which one of several kinds of tissue is present, as the property in question on the basis of a multimodal image. The multimodal image may then be further augmented by generating or otherwise providing a map that shows the spatial distribution of different kinds of tissue. This exemplary map may be superimposed on the multimodal image to add a new dimension of information. This superposition may be semi-transparent, so that the image shows which kind of tissue is present where on the examined sample, while at the same time revealing detailed geometrical features of this tissue.

For example, the set of features can comprise at least one intensity related property, IRP, and/or at least one geometrical feature. Most features that indicate a possibly cancerous modification, a lesion, or an inflammation of tissue can likely fall within these categories.

In a further exemplary embodiment of the present disclosure, one or more features may be related to the architecture, chronicity and/or activity of the tissue. Architecture can mean, e.g., the degree of crypt distortions (shape, density and arrangement). Chronicity can mean, e.g., the degree of infiltration of lamina propria by lymphocytes and plasma cells. Activity can mean, e.g., the presence of neutrophils within the lamina propria or within epithelial structures, such as the surface epithelium, the crypt epithelium (cryptitis) and lumen (crypt abscess), as well as epithelial cell damage. To determine whether inflammation as the property in question is present in the tissue, a suitable discriminant can, for example, comprise features that may be signs for architecture, chronicity and/or activity. The discriminant itself, as a weighted function of the pronunciation indices of these features, can be a measure for architecture, chronicity and/or activity. If the value of the discriminant exceeds a pre-set threshold, it can be determined that inflammation is present in the tissue. If the value of the discriminant does not exceed the threshold, it can be determined that no inflammation is present in the tissue.

Therefore, in yet further exemplary embodiment of the present disclosure, the discriminant value can be a measure for the degree of crypt distortions, and/or
the degree of infiltration of lamina propria by lymphocytes and plasma cells, and/or the presence of neutrophils within the lamina propria or within epithelial structures such as the surface epithelium, the crypt epithelium and lumen, and/or unequivocal epithelial cell damage, and/or tissue type, and/or malignancy degree.

The discriminant may, for example, be obtained using linear discriminant analysis, LDA; with a supervised classification model. In this way, combinations of features that are not very conclusive for the detection of the property on their own, and can be relevant in combination, may be selected for inclusion into the discriminant. Similarly to the assessment of the weights accorded to individual features, training using training images acquired on training samples can be used, where a "gold standard", e.g., an assessment by an experienced pathologist, is used as reference information whether the property in question is present in the training sample.

As a result of an exemplary quantitative analysis, a prediction of inflammation based on the thresholding of a discriminant that is a measure for architecture can be particularly accurate. Advantageously, to compute this discriminant, e.g., in an exemplary embodiment of the present disclosure, only geometrical features of crypts have to be detected in the image. In addition, the computation itself can be simple. Inflammation can also be predicted by thresholding a discriminant that is a measure for chronicity and/or for activity. Further, to detect the features that make up such discriminants, harder-to-obtain image properties, such as the intensity related properties of CARS and TPEF, may be measured.

For example, one or more of the following geometrical properties of crypts may be used as features:

the number of pixels in the crypt's region (area);

the ratio of the largest diameter to the smallest diameter (aspect ratio);

the ratio of the crypt's area and the square of its perimeter (circularity);

the number of crypts divided by the epithelium area (crypt density);

the ratio of the distance between the foci of the equivalent ellipse and its major axis length (eccentricity);

the diameter of a circle with the same area as the crypt's region (equivalent diameter);

the ratio of the pixel in the crypt's region to pixels on the total bounding box of the crypt (extent);

the number of pixel of the boundary of the crypt's region (perimeter);

an increased variability in intercryptal distances;

a loss of crypt density (mucosal atrophy);

a branching of crypts; and a separation of crypts from the muscularis mucosae.

other morphological parameters

For example, one or more of the following intensity related properties, IRP, that relate to contrast may be used as features:

a CARS-TPEF contrast, (CARS−TPEF)/(CARS+TPEF);

a CARS-SHG contrast, (CARS−SHG)/(CARS+SHG);

a TPEF-SHG contrast, (TPEF−SHG)/(TPEF+SHG);

a contrast between CARS images acquired at different wavenumbers 2850 cm$^{-1}$ and 2930 cm$^{-1}$, (CARS2850−CARS2930)/(CARS2850+CARS2930);

a contrast between TPEF images acquired at different wavelengths 458 nm and 525 nm, (TPEF458−TPEF525)/(TPEF458+TPEF525).

For example, one or more of the following intensity related properties, IRP, that relate to texture may be used as features:

an average intensity of the histogram, an average contrast, a relative smoothness of the histogram, a skewness of the intensity histogram ($3^{rd}$ moment);

a uniformity of the histogram (that is maximal when all intensity values are equal);

a variability of the intensity histogram (entropy);

or other moments of the histogram.

Covariances between different imaging modalities (CARS, TPEF, SHG, SRS) may also be exploited as features.

Advantageously, e.g., the exemplary set of features above can be selected in a way such that they are rotational independent. This can be important for the local prediction of the property in question, since it can prevent the prediction of the property from being biased.

In yet another exemplary embodiment of the present disclosure, the property can be a histological index, a malignancy grade and/or a tissue type. These exemplary properties can typically manifest themselves in diverse features, where the degrees of correlation between the pronunciation of the features and the presence of the property in question is very different. The weighted sum of the pronunciation indices of these features makes it possible to pool a large number of features for determining whether the property is present or not. In the exemplary computation of the discriminant value, the information contained in the highly relevant features can be complemented by the information contained in the less relevant features. Even if the less relevant features greatly outnumber the highly relevant features, they will likely not weaken the information contained in these highly relevant features down.

In another exemplary embodiment of the present disclosure, the ranking of the weights associated with the features can correspond to the ranking of the Fisher's discriminant ratios, FDR, of said features with respect to a histological index as the property in question, and/or the relevance indices of the features are derived from said FDR. The FDR of a feature can be a measure for that feature's ability to discriminate different levels of histological indices. FDR are simple to compute and are independent of the type of class distribution. Large FDRs can outline features that are utilized best for class separation and discrimination of histological index levels.

Treating features individually, the FDR can measure the classification capability with respect to a two-class problem in one-dimensional feature space. The FDR can be defined as $$FDR = \frac{(\mu_1 - \mu_2)^2}{\sigma_1^2 + \sigma_2^2}, \tag{1}$$

where $\mu_1$ and $\mu_2$ are the mean values for first and second classes respectively and $\sigma_1$ and $\sigma_2$ the variance values of a particular feature. High FDRs are obtained for a particular feature if the distribution of the two classes has small variances and display a large difference of mean values. This behavior is also obvious from the definition of the FDR in equation (1), which indicate that large differences between the mean values of each class and small variances within each class result in a high FDR. Thus, high FDRs imply a good class separation can be achieved utilizing a particular feature. The opposite scenario would be closely located classes with large class variance that would result in a low value of the FDR and hence in poor class separation.

For example, one or more of the following features related to architecture may be used as features in the method (geometrical features being underlined):
equivalent diameter (FDR=4.41);
area (FDR=3.93);
CARS@2930 cm$^{-1}$ to TPEF@525 nm contrast of crypts (FDR=2.65);
TPEF@525 nm (mean) of crypts (FDR=2.49);
perimeter (FDR=2.34);
crypt density (FDR=2.24);
TPEF@458 nm (smoothness) of crypts (FDR=2.19);
CARS@2850 cm$^{-1}$ ($3^{rd}$ moment) of epithelium without crypts (FDR=2.12);
TPEF@525 nm (standard deviation) of crypts (FDR=2.06);
radius (FDR=1.93).

For example, one or more of the following features related to chronicity may be used as features in the method (with geometrical features underlined):
CARS@2930 cm$^{-1}$ (mean) of epithelium without crypts (FDR=1.97);
equivalent diameter (FDR=1.18);
area (FDR=1.05);
TPEF@458 nm (standard deviation) of crypts (FDR=1.02);
perimeter (FDR=0.92);
radius (FDR=0.86);
TPEF@525 nm (uniformity) of crypts (FDR=0.84);
CARS@2850 cm$^{-1}$ (uniformity) of epithelium without crypts (FDR=0.74);
TPEF@525 nm (mean) of epithelium without crypts (FDR=0.66).

For example, one or more of the following features related to activity may be used as features in the method (with geometrical features underlined):
CARS@2850 cm$^{-1}$ (mean) of epithelium without crypts (FDR=1.02);
CARS@2850 cm$^{-1}$ ($3^{rd}$ moment) of epithelium without crypts (FDR=0.64);
TPEF@525 nm ($3^{rd}$ moment) of epithelium without crypts (FDR=0.63);
equivalent diameter (FDR=0.53);
TPEF@525 nm (mean) of epithelium without crypts (FDR=0.52);
area (FDR=0.47);
TPEF@525 nm (mean) of crypts (FDR=0.46);
CARS@2850 cm$^{-1}$ ($3^{rd}$ moment) of crypts (FDR=0.42);
perimeter (FDR=0.41);
radius (FDR=0.39).

Comparing the maximum possible values of the FDR, e.g., distinct levels of architecture ($FDR_{max}$=4.41) are likely to be more simple to separate than for chronicity and activity with FDRs <1.97. Consequently, a classification of the architecture levels can result in a more favorable outcome and/or can be treated computationally less elaborated than any prediction of the chronicity and activity.

Further, the number of top-ranked geometrical properties of crypts can be largest for the architecture index differentiation as expect from its definition as a measure of crypt distortion. For example, the most significant geometrical features can be the equivalent diameter, area, crypt density and perimeter of crypts. On the other hand, geometrical properties can be, e.g., possibly of lower significance for the classification of the chronicity and activity as both criteria judge the presence of various types of lymphocytes and form measures of earlier or active inflammation, respectively. The remaining significance of geometrical properties provides no contradiction to the definition of chronicity and activity. Instead, the remaining importance can reflect the correlation between chronicity and activity to the architecture that is constantly changed by, for example, the inflammation induced rejuvenation of the colon.

Due to the reduced impact of geometrical properties, the IRPs can be of a high significance for differentiation of chronicity and activity levels. Generally, CARS and TPEF related measures can be top-ranked while no SHG related feature was rated among the top-ten FDR values. Though the FDR values for SHG features of the architecture can be close to zero, its impact may increase towards chronicity and activity. Among IRPs, the most significant features are identified as the mean and 3rd moment of CARS@2850 cm$^{-1}$, the mean of CARS@2930 cm$^{-1}$, the CARS@2930 cm$^{-1}$-to-TPEF@525 nm contrast as well as the mean and standard deviation of TPEF@525 nm and TPEF@458 nm.

Furthermore, the FDRs of areas comprising crypts is likely highest for the architecture and decreases stepwise from the chronicity towards the activity in favor of the mucosal area excluding crypts. This observation is likely because an active inflammation starts outside crypts while a chronic IBD clearly affects crypts and the architecture is the index of the crypts' alteration.

Interestingly, TPEF collected around 525 nm can be of higher impact for the evaluation of the activity and less for the architecture in comparison to TPEF collected at 458 nm while this trend reverses for chronicity. Similarly, CARS at the Raman resonance 2930 cm$^{-1}$ can have more importance for staging of the architecture and chronicity while for the activity the significance of CARS at the Raman resonance 2850 cm$^{-1}$ can be more pronounced.

In a further exemplary embodiment of the present disclosure, the property in question can be the presence of a cell nucleus in a specific place in the sample. Depending on the technique used for acquisition of the image, many features that can be useful for the computation of a discriminant may be shown in the image, while the cell nucleus may not be a feature that exhibits a contrast when the sample is imaged using this technique. The position of the cell nucleus may be important for the visual interpretation of the image, and/or this position may be a feature on its own that goes into the computation of a discriminant value.

Therefore, in a still further exemplary embodiment of the present disclosure, in response to the determination that a cell nucleus is present in a specific place, the cell nucleus can be marked in said specific place in the image, and/or in a processed version of the image. The analysis of the image then yields quantitative information for further use, as well as serves to improve the image itself as well.

In another exemplary embodiment of the present disclosure, the appearance of the sample that would result from exposure of said sample to at least one staining agent, e.g., hematoxylin and/or eosin, can be computed as the processed version of the image. Such computational staining can be faster than the actual staining with staining agent, and it can leave the sample untouched for further investigations.

For example, a multimodal combination of CARS, TPEF and SHG imaging may yield a cryosection image from which a purely computational hematoxylin and eosin, HE, image can be derived by means of multivariate statistics. This image can be analyzed by a pathologist in the same manner as a normal HE image obtained by staining of the sample. Preferably, a pre-set partial least squares regression model, PLS, and/or a linear discriminant analysis, LDA, may be used to obtain the computationally stained image. The multivariate statistics, especially a PLS or an LDA, may preferably be trained beforehand. PLS is a multivariate regression method that estimates relationship between two datasets and differs from traditional least squares regression in utilizing information of the independent and dependent variables. The RGB values of the computationally stained image may be modeled using the three color channels of the multimodal image.

If a computationally stained image is obtained in this way, this image will lack the cell nucleus, since this produces a negative contrast in the multimodal image. Therefore, it is advantageous to enhance such an image by inserting the cell nucleus afterwards. The position of the cell nucleus in a specific place in the multimodal image is the property in question, and to determine whether this property is present or not, a linear discriminant may be used that comprises certain fingerprints of the CARS, TPEF and SHG intensities as individual features. By thresholding the discriminant, it may be determined whether a cell nucleus is present in the place in question or not. After it has been determined in this way where cell nuclei are present, the computationally stained image can be augmented accordingly, e.g., by adding a layer showing the cell nuclei.

The multivariate statistics that is producing the computationally stained image can also apply the exemplary method according to the present disclosure. It is known with which types of tissue the staining agents will react to produce an image contrast, and thus the question of how each pixel in the computationally stained image should be colored turns to the determination of tissue type and other properties. PLS and LDA determine these properties as described above.

In the obtaining of the computationally stained image, any suitable technique may be utilized to separate the foreground, where biological matter is actually present on the sample, from the background. For example, the original multimodal image may be segmented by k-means clustering, e.g., with k=6. The pixels of the darkest class, i.e., the class with the lowest value of sum over squared class center, may then be considered as background contribution, and a background mask may be calculated. To remove noise contributions in the segmentation result, the estimated background may be filtered, for example, using a median filter. Thereafter, morphological closing may be applied to fill gaps in the foreground and extend the foreground area. The background mask, on the other hand, may be morphologically opened to remove small foreground areas and smooth the background edges, and/or the sample contour. The resulting mask may then be mean-filtered and used as a weighting mask. This facilitates a smooth removal of actual features from large background areas.

Furthermore, in the obtaining of the computationally stained image, the original multimodal image may be subject to any suitable pre-processing, such as median filtering to remove noise, down-sampling to speed up computation and reduce computer data storage (Random-access memory and/or data storage media), correction for uneven illumination and contrast adjustment.

In a further exemplary embodiment of the present disclosure, the exemplary method can further comprise:
 identifying, from the outcome of the determination step, and/or from the processed version of the image, a red flag area, RFA, on the sample;
 acquiring additional physical measurement data within the RFA on the sample; and
 determining whether a tested property is present or absent from the additional physical measurement data.

For some properties, e.g., a physical measurement technique may exist that can unequivocally determine this property in one specific place in the sample, and it may take too long to scan the whole sample using this technique. As an example, scanning probe microscopy can investigate properties on the sample in great detail and with great specificity, although the scanning range can usually be limited to a few microns, or tens of microns. If the query is whether the property is present anywhere within a large sample that may have a size on the order of several $cm^2$, an investigation at this micro-scale alone may be too slow. The computational image analysis described above, and/or a visual inspection of the computationally stained image, can be a significantly faster pre-test that can immediately discard irrelevant parts of the sample and identifies the RFA where a further investigation using a much slower method is appropriate. This can be similar to border crossing points where the officer decides from one look in a split-second whether to wave that car through, like most of the thousands that pass through the checkpoint each day, or whether to single it out for a contraband inspection that may take hours. The exemplary acquisition of additional physical measurement data may, for example, comprise immunostains or other labelfree spectroscopic techniques featuring a higher molecular sensitivity than multimodal imaging.

In yet another exemplary embodiment of the present disclosure, the acquisition of additional physical measurement data can comprise acquiring at least one Raman spectrum within the RFA on the sample. Raman spectroscopy can be important for its high specificity yielding information based on inherent molecular vibrations that—like fingerprints—characterize specifically chemical structures and biochemical compositions of biological tissue. For example, spatially resolved Raman maps may be acquired in the RFA by acquiring Raman spectra in multiple places within the RFA.

In a still further exemplary embodiment of the present disclosure, the exemplary determination can comprise performing a supervised statistical analysis of the additional physical measurement data. For example, k-means, Weighted k-Nearest Neighbors, KKNN or principal component analysis (PCA) may be used. K-means is an unsupervised classification method that arranges the unlabeled dataset into a given number of groups (clusters). It starts with a random distribution of cluster centers and iteratively moves them in order to minimize the total within-cluster variance. KKNN is a non-parametric supervised classification method that is often used because of its simplicity and good performance. To assign a new observation, first the k observations of each class in the training dataset have to be found, which are closest to the new observation. Then the new observation is classified through the majority vote among the k neighbors. KKNN—as an extension of k-Nearest Neighbors algorithm—also takes into account the individual distances of the nearest neighbors to the new observation in the form of weights.

For example, the exemplary supervised statistical analysis can comprise a principal component analysis (PCA). The PCA can transform the variables of a dataset into a new set of variables that are linear combinations. The new values can be called principal components and are ranked according to the variance of the data so that the first principal component provides the greatest values of data variance.

Selecting, e.g., only the first few principal components can facilitate a dimensionality reduction with a marginal loss of information.

The reason for the supervised statistical analysis can be to map all Raman spectra into a space with reduced dimensionality. In this space, the Raman likely scans form discrete clusters. In a workflow called spectral-histo-pathology (SHP) first a training can be performed based on a set of training samples and the experience of a human pathologist. The pathologist likely sees only a (computationally or actually) stained image of the training sample and makes a determination whether the property in question is present or absent in the sample. After every such determination, points in said space corresponding to the Raman spectra acquired on the training sample are assigned this determination. From a plurality of determinations performed on a plurality of training samples, a trend can emerge that assigns a determination whether the property is present or absent in the sample to areas and/or clusters in the space where the Raman spectra acquired in the RFA of the sample reside. In this way, a multi-dimensional lookup table is generated. When an unknown sample is imaged, an RFA can be identified and a Raman spectrum can be acquired in the RFA, it may be determined where in said space the newly acquired Raman spectrum resides, and the determination whether the property in question is present or absent in the sample may be set to the determination associated with the location of the newly acquired Raman spectrum in said space.

The exemplary property investigated using Raman spectroscopy and spectral histo-pathology may, for example, be whether the tissue is tumor, adenoma or carcinoma tissue.

In a further exemplary embodiment of the present disclosure, the method can further comprise, after acquiring of the image, selecting an area of interest, AOI, for the further processing of the image or for performing additional measurements.

The exemplary embodiment of the method according to the present disclosure may be daisy-chained, and/or augmented with any suitable post-processing, and/or applied multiple times with different discriminants to refine a prediction of tissue, for example, to reduce the rate of false positives in the prediction of cancer. For example, in a first or initial procedure/step, the exemplary method may be applied once to discriminate between one or more kinds of healthy tissue versus cancerous tissue. Connected regions that have been predicted as being cancerous tissue may then be evaluated further by applying the exemplary method again with different discriminants that each discriminate between cancer versus glandular tissue, cancer versus inflamed area, and cancer versus smooth muscle, respectively. The original prediction as cancerous may then, for example, be upheld only for a connected region where all three further discriminants determine the tissue to be cancerous.

According to another exemplary embodiment of the present disclosure, a computer accessible medium can be provided that stores a computer software thereon can be provided, and the computer software can configure the computer to determine the presence or absence of a local and/or global property of a biological tissue sample.

The computer software may be part of a computer program, but it can also be an entire program by itself. For example the computer software may be used to update an already existing computer program. The computer-accessible medium may be or include a storage medium, such as for example, a USB stick, a CD, a DVD, a data storage device, a hard disk, or any other medium on which the computer software described above can be stored.

Experimental details and results including color images have been published after the filing date of this application in the following scientific papers:

[1] T. Bocklitz, F. S. Salah, N. Vogler, S. Heuke, O. Chernavskaia, C. Schmidt, M. Waldner, F. R. Greten. R. Brauer. M. Schmitt, A. Stallmach, I. Petersen & J. Popp, "Combining CARS/TPEF/SHG multimodal imaging and Raman-spectroscopy as a fast and precise non-invasive pathological screening tool", BMC Cancer 2015, submitted

[2] S. Heuke, O. Chernayskaia, T. Bocklitz, F. B. Legesse, T. Meyer, D. Akimov, O. Dirsch, G. Ernst, F. von Eggeling, I. Petersen, O. Guntinas-Lichius, M. Schmitt & J. Popp, "Multimodal nonlinear microscopic investigations on head and neck squamous cell carcinoma—an automatic approach", Head & Neck 2015, submitted

[3] Olga Chernayskaia, Sandro Heuke, Michael Vieth, Oliver Friedrich, Sebastian Schürmann, Raja Atreya, Andreas Stallmach, Markus F. Neurath, Maximilian Waldner, Iver Petersen, Michael Schmitt, Thomas Bocklitz, Jurgen Popp, "Beyond endoscopic mucosal healing in inflammatory bowel disease: real-time histology of disease activitiy by non-linear multimodal imaging", Scientific Reports 2016, in preparation.

Financial support of the "Bundesministerium für Bildung and Forschung" under grant numbers FKZ 13N10774, 13N12525 and 13N12526 is gratefully acknowledged.

The aspects described above and further aspects, features and advantages of the present disclosure may also be found in the exemplary embodiments which are described in the following with reference to the appended drawings and claims.

BRIEF DESCRIPTION OF THE DRAWINGS

Further exemplary embodiments of the present disclosure are detailed in the description of the Figures, where this description shall not limit the scope of the present disclosure. The Figures show.

Figure 1:
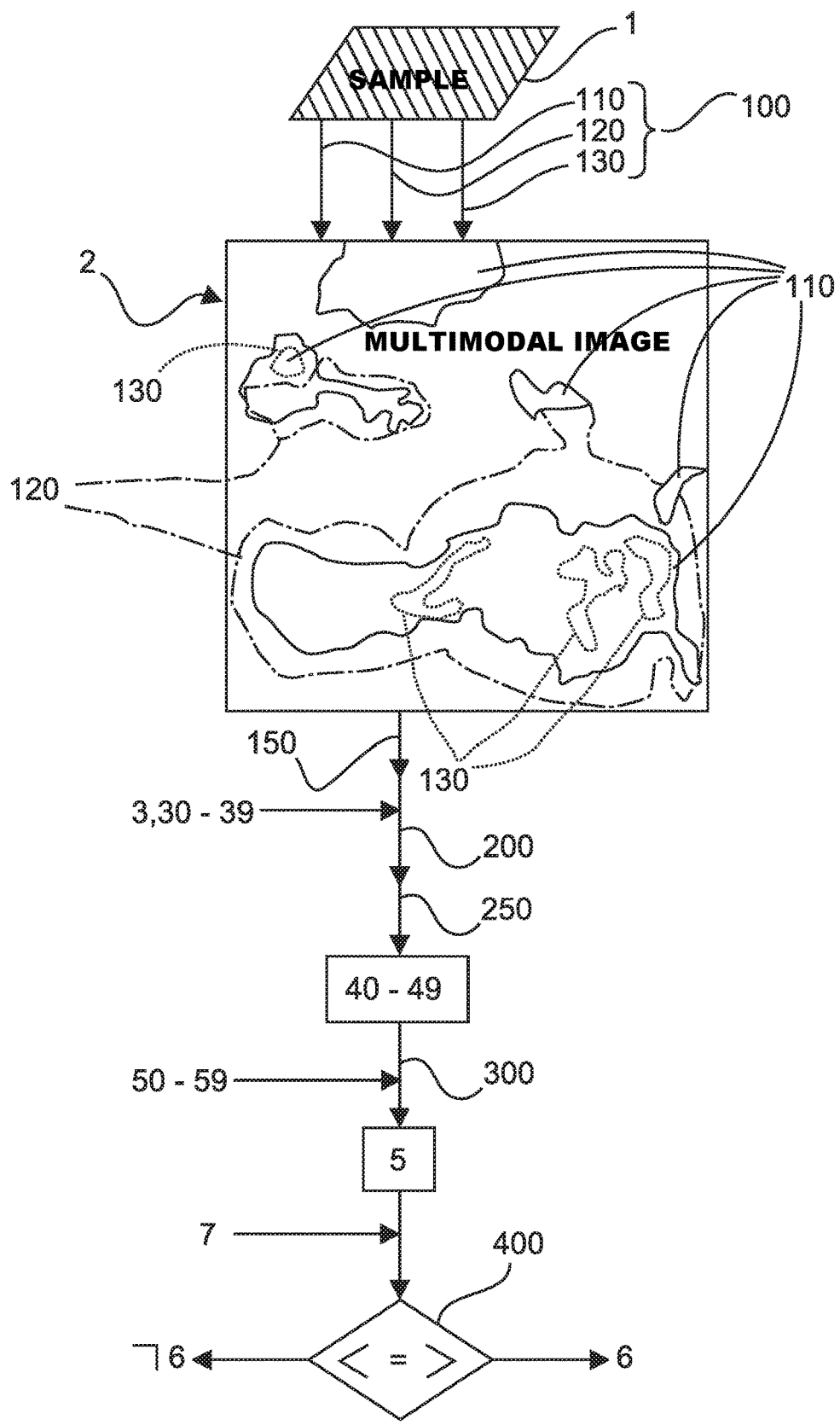
FIG. 1: A flow diagram of an exemplary embodiment of the method according to the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure as defined by the appended claims.

DETAILED DESCRIPTION OF EXEMPLARY EMBODIMENTS

FIG. 1 illustrates a flow diagram of an exemplary embodiment of the method according to the present disclosure. As shown in FIG. 1, a sample 1 is investigated using CARS 110, TPEF 120 and SHG 130 simultaneously. The information from all three imaging modes can be pooled in one single multimodal image 2. For example, the three imaging modes contribute shades of different colors to the image 2. Since FIG. 1 is provided in black and white, prominent features made visible by each of the imaging modes CARS 110, TPEF 120 and SHG 130 are sketched by different line types.

Optionally, an area of interest, AOI, may be selected from the image 2 in procedure/step 150.

At procedure/step 200, the image 2 is searched for the presence of each feature 30-39 in a set 3 of features 30-39. At step 250, a pronunciation index 40-49 can be assigned to each feature 30-39. This pronunciation index 40-49 is a measure of how pronounced each features 30-39 is present in the image 2.

Figure 3:
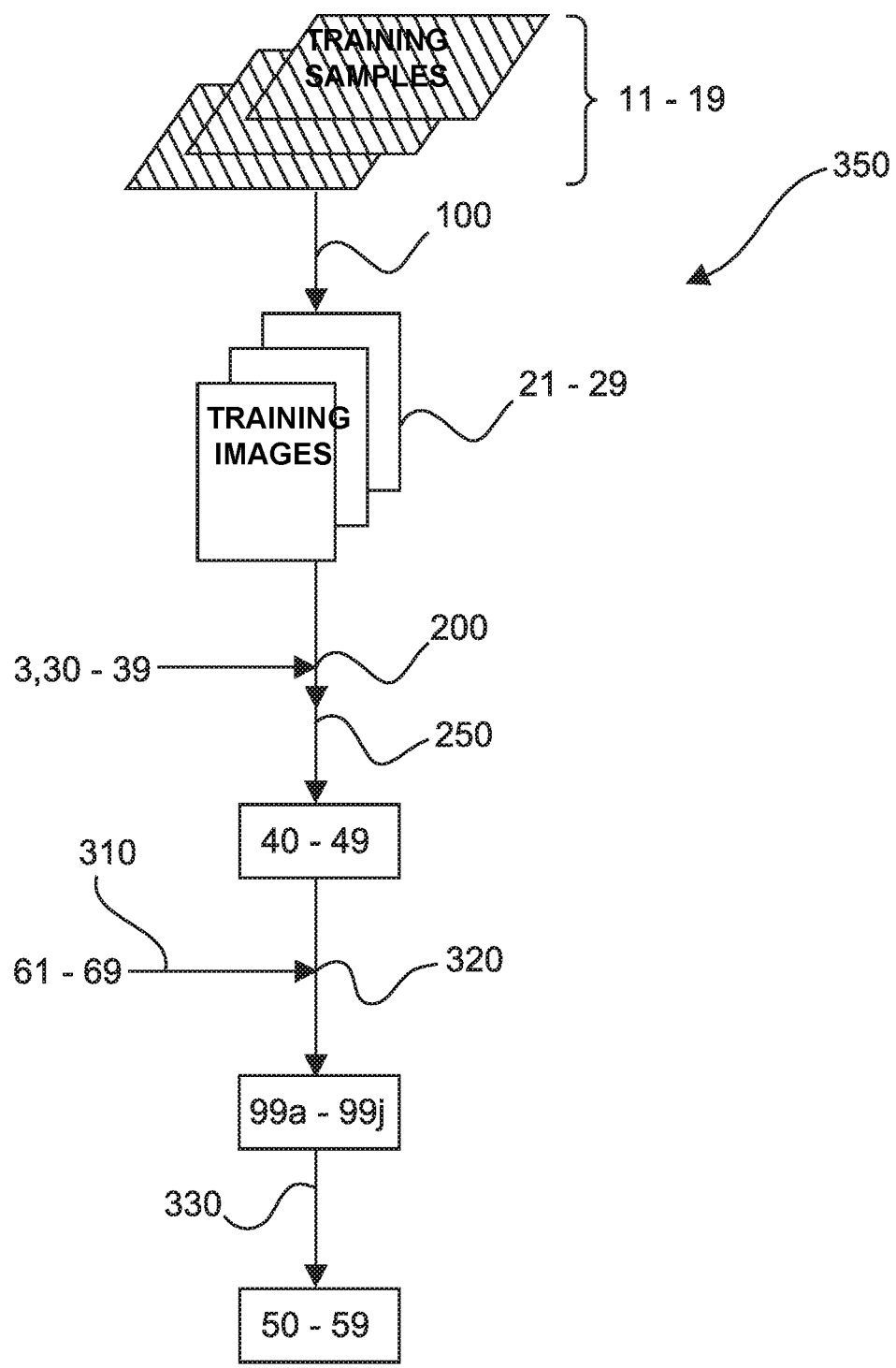
FIG. 3: A flow diagram of an exemplary embodiment of a training process for the obtaining 350 of weights 50-59.

These pronunciation indices can be combined into a weighted sum 5, i.e., into a linear discriminant value, LD, at step 300. The weights 50-59 that are attributed to the individual features 30-39, and hence applied to their corresponding pronunciation indices 40-49, have been previously obtained by a training process that are shown in FIG. 3.

The discriminant value 5 can then be compared with a threshold 7 at procedure/step 400. If the discriminant value 5 exceeds the threshold 7 (branch labeled ">"), then it is determined that the property 6 is present in the sample 1. If the discriminant value 5 does not exceed the threshold 7 (branch labeled "<="), it is determined that the property 6 is absent in the sample 1 (labeled "negative 6"="¬6").

Figure 2:
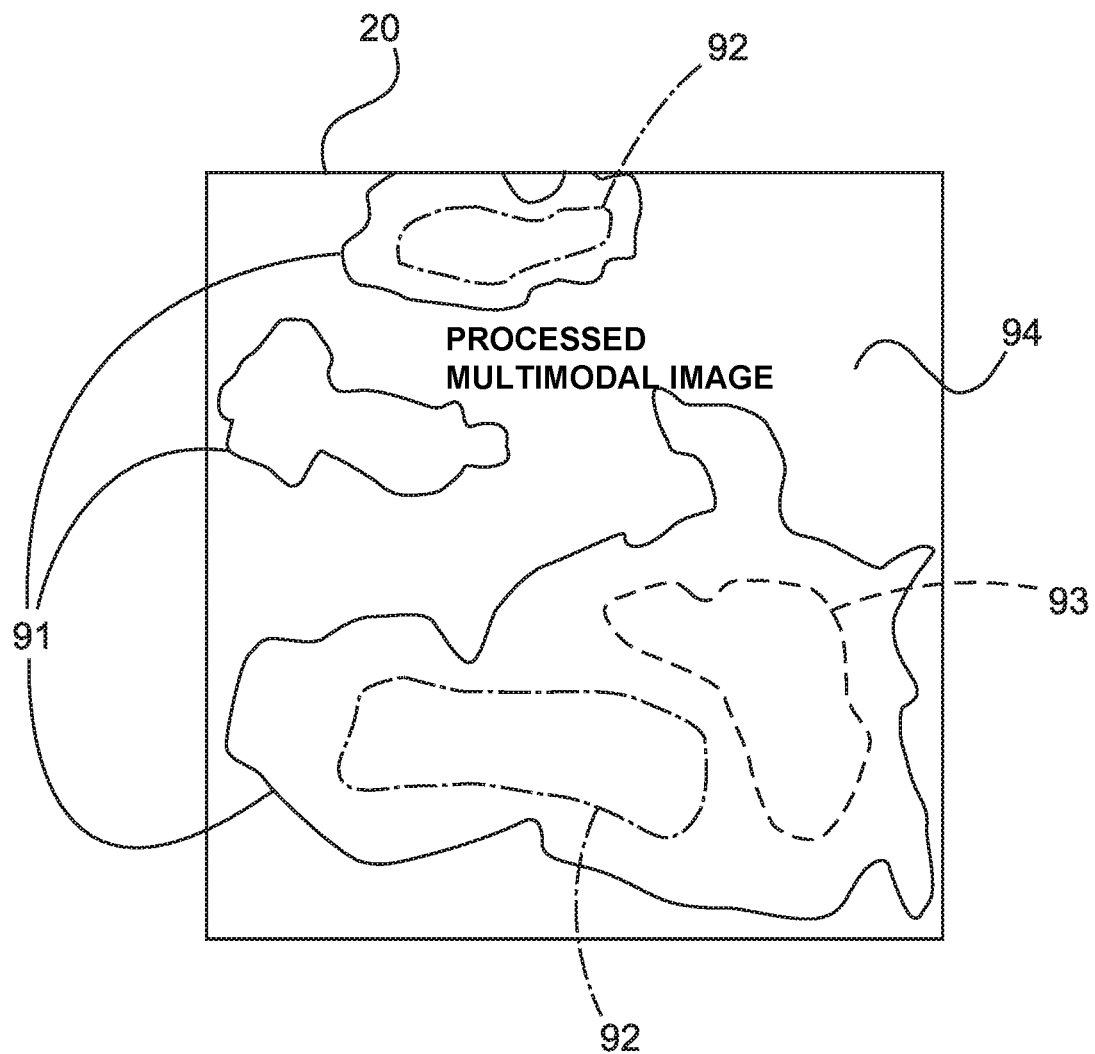
FIG. 2: An exemplary illustration of an identification of different tissue types that includes a processed version of an image.

FIG. 2 shows an illustration of a processed version 20 of the image 2 in which different kinds 91 (benign and healthy), 92 (malignant) and 93 (benign but inflamed) of tissue have been identified and marked with different line types accordingly. The area labeled 94 is background where no biological material is present on the sample. The borders of the regions with different kinds 91, 92 and 93 of tissue do not always correspond with the borders of features visible in the original image 2 that is shown in FIG. 1, although both the original image 2 and the processed version 20 relate to the same sample 1. Rather, it has been determined as property 6 which kind 91, 92, 93 of tissue is present where, and this information has been mapped in the processed version 20 of the image 2.

There are several ways to arrive at the information shown in FIG. 2. For example, if discriminants 5 are used that can only distinguish between the presence and absence of one single property 6, then, for each point in the original image 2, three discriminants 5 that each determine 400 whether one type 91, 92 or 93 of tissue is present at the corresponding location in the sample 1 may be daisy-chained. However, this information can also be determined with one single discriminant 5 that can, for each point in the original image 2, discriminate between several kinds of tissue. No matter which kind of discriminant 5 is used, detection of different kinds of tissue is not limited to a pixel-by-pixel scan of original image 2. Rather, it may be advantageous to detect certain blocks of tissue as features.

FIG. 3 illustrates a flow diagram of a learning process that can be used to obtain the weights 50-59 according to an exemplary embodiment of the present disclosure. For example, training images 21-29 can be acquired in procedure/step 100 on a plurality of training samples 11-19. Features 30-39 from set 3 of features 30-39 can be detected in procedure/step 200 in these training images 21-29, and corresponding pronunciation indices 40-49 can be computed. Reference information 61-69 whether the property 6 in question is present in the training samples 11-19 can be acquired in procedure/step 310. For every feature 30-39, an individual correlation 99a-99j between the value of the pronunciation index 40-49 and the presence or absence 61-69 of the property 6 in the training samples can be computed. The weight 50-59 that is attributed to each feature 30-39, and with which each pronunciation index 40-49 goes into the discriminant 5, can then be set in procedure/step 330 to the value of the obtained correlation 99a-99j. FIG. 3 shows a simple example where the features 30-39 are examined one by one for the correlation 99a-99j. If a multivariate approach is used for the computing in procedure/step 320 of the correlation 99a-99j, such exemplary approach may also recognize that several features 30-39 that on their own not very relevant form a highly relevant combination.

Figure 4:
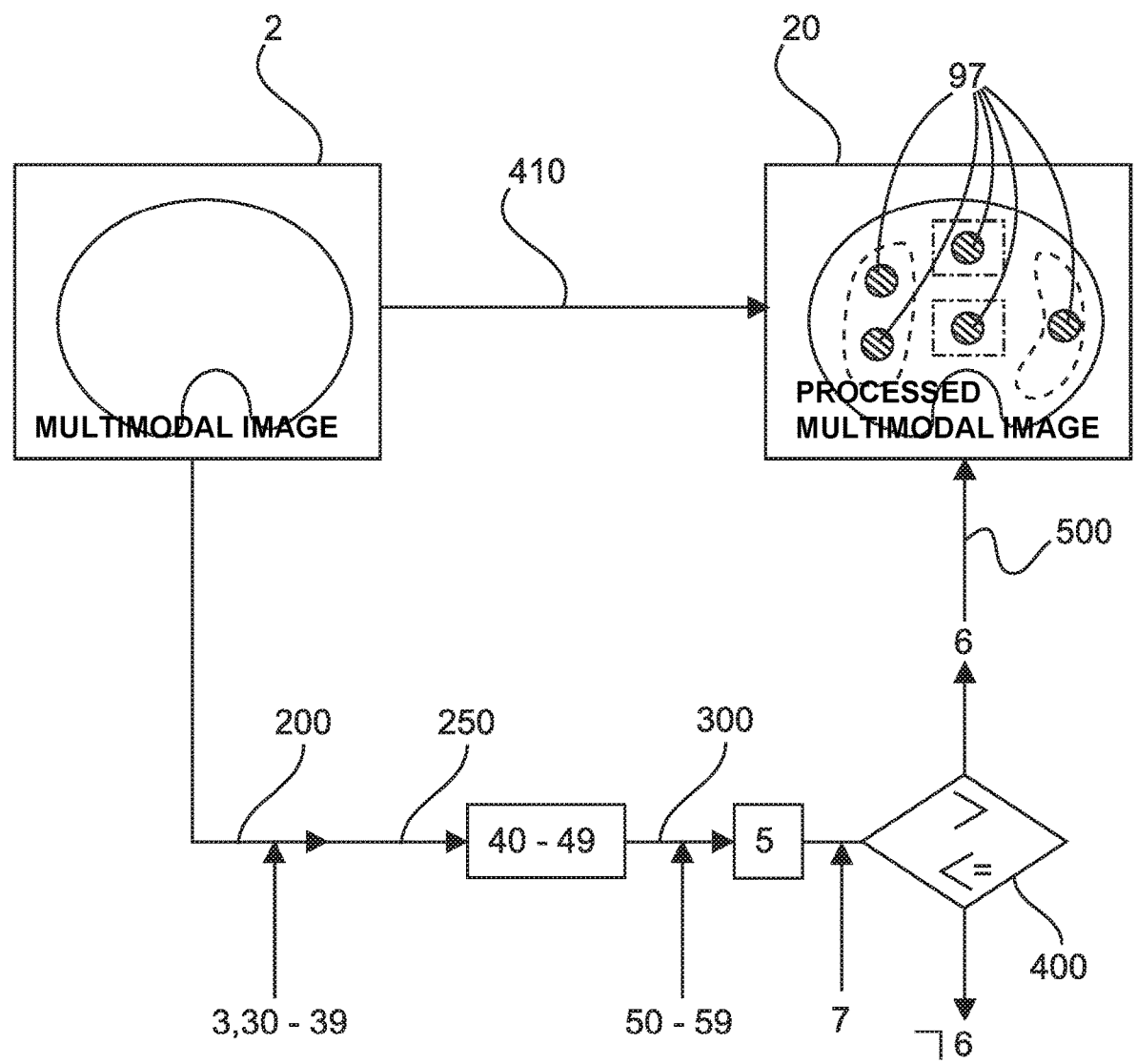
FIG. 4: A flow diagram of an exemplary embodiment of a marking 500 of cell nuclei 97 in processed version 20 of image 2.

FIG. 4 illustrates a flow diagram of how a computationally stained image 20, which has been obtained in procedure/step 410 from the original multimodal image 2, can be augmented further by addition of cell nuclei 97. The exemplary embodiment of the method illustrated in FIG. 1 can be applied to the original multimodal image 2 multiple times, with the property 6 in question being whether a cell nucleus 97 is present in a given place on the sample 1. Wherever this determination in procedure/step 400 is positive, the cell nucleus 97 can be marked in procedure/step 500 in the computationally stained image 20.

Figure 5:
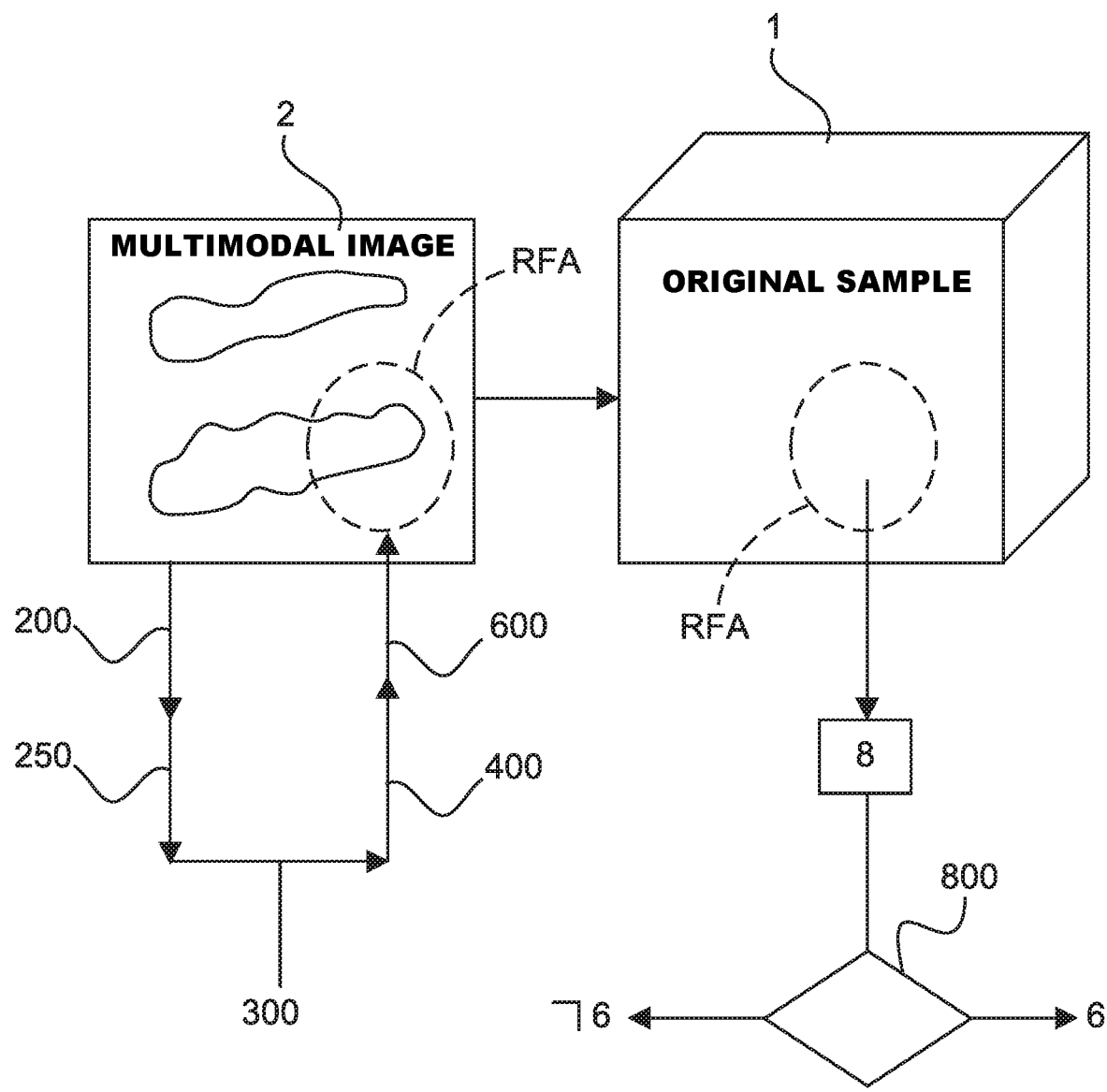
FIG. 5: A flow diagram of an exemplary embodiment of a closer investigation of a red flag area, RFA, by acquiring 700 additional physical measurement data 8.

FIG. 5 illustrates a flow diagram of an exemplary two-step process that combines the fast analysis of a multimodal image 2 with a detailed further analysis of red flag areas, RFA. Using the exemplary method procedures/steps 200, 250, 300, 400, 600 as illustrated in FIG. 1, a red flag area, RFA, can be determined in the multimodal image 2. An area on the original sample 1 that corresponds to this RFA is then subjected to additional physical measurements in procedure/step 700, such as Raman spectroscopy, to yield additional physical measurement data 8. Based on these data 8, it can be determined at procedure/step 800 whether the property in question, e.g., cancer, is present 6 or absent ¬6 in the sample 1. The Raman spectroscopy in procedure/step 700 can be slower than the acquisition of the multimodal image 2, although since the RFA covers only a small portion of the sample 1, the total time required to arrive at the determination in procedure/step 800 remains tractable.

Figure 6:
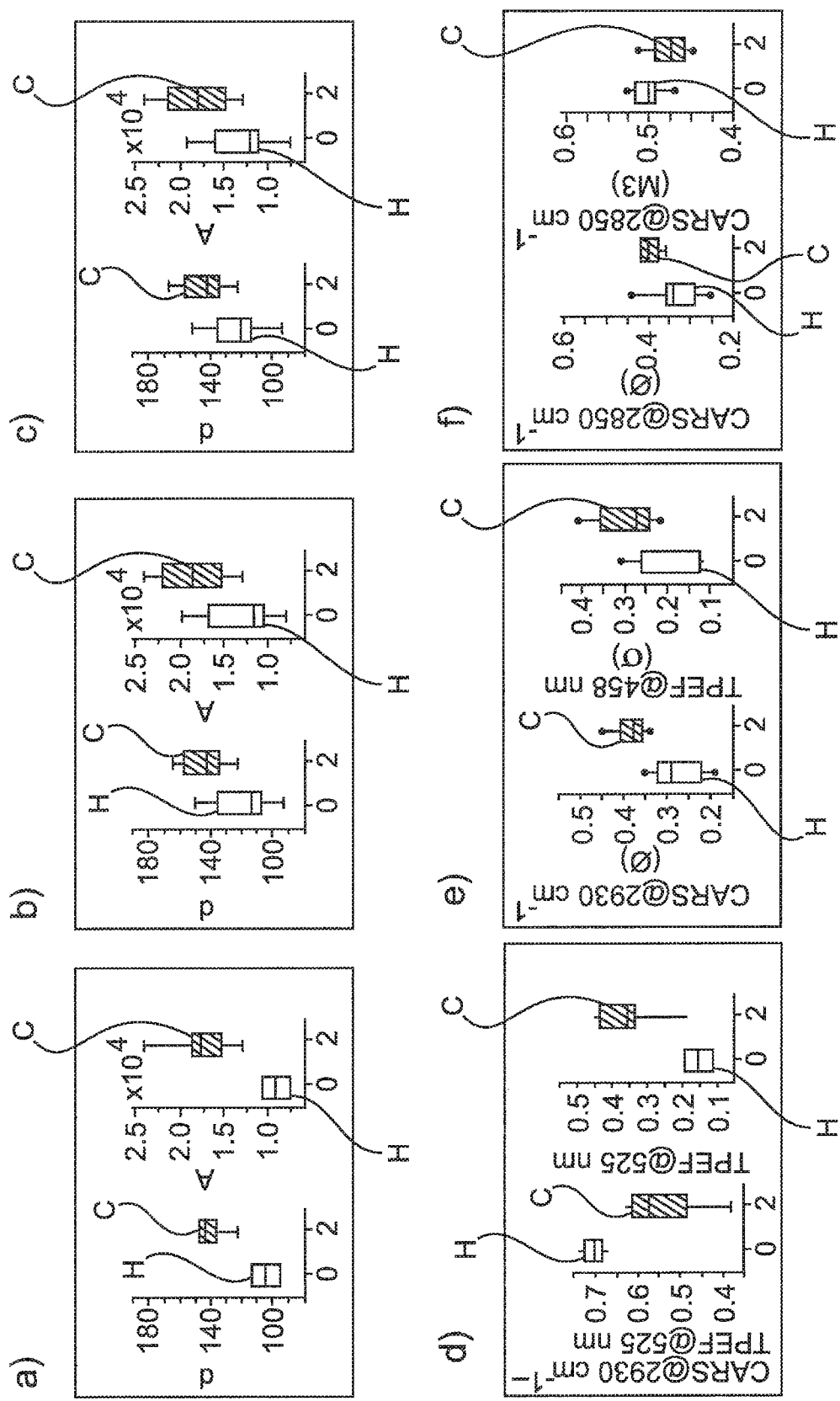
FIG. 6: Exemplary graphs of boxplots of exemplary properties for discrimination of architecture, chronicity and activity indices.

FIG. 6 shows exemplary graphs of boxplots of the two exemplary features 30-39 each for the discrimination of sample properties, using of geometrical properties of crypts, of architecture (sub-figure a), chronicity (sub-figure b) and activity (sub-figure c), as well as for the discrimination, using of intensity related properties, IRP, of architecture (sub-figure d), chronicity (sub-figure e) and activity (sub-figure f). The respective features 30-39 were measured on test samples 11-19, for which reference information 61-69 whether cancer was present as property 6 on the respective sample 11-19 was available. Healthy samples and altered samples were separated and are shown in different box plots labeled H and C. d is the equivalent diameter of crypts, A is the area of crypts, Ø denotes a mean, M3 denotes a $3^{rd}$ moment, and a denotes a standard deviation. In sub-figure d, both the CARS-TPEF contrast and the TPEF mean were acquired on crypts. In sub-figure e, the CARS mean was acquired on the epithelium without crypts, but the TPEF standard deviation was acquired on crypts. In sub-figure f, both the CARS mean and the CARS $3^{rd}$ moment were acquired on the epithelium without crypts.

The exemplary boxplots show that the exemplary features 30-39 relating to architecture (geometric properties in sub-figure a and IRP in sub-figure d) already show a very marked contrast between healthy samples H and altered samples C, while the features 30-39 relating to chronicity (sub-figures b and e) and activity (sub-figures c and f) are not yet conclusive for the discrimination between healthy samples H and altered samples C by means of the chronicity index resp. the activity index.

In all sub-figures a to f of FIG. 6, the values on the horizontal axes denote histological indices assigned by the trained pathologist to the training samples, i.e., the reference information 61-69. A completely healthy sample is always given a histological index of 0. Full-blown alteration determined on the basis of architecture or chronicity is assigned a maximum histological index of 2, while full-blown alteration determined on the basis of activity is assigned a maximum histological index of 1.

Figure 7:
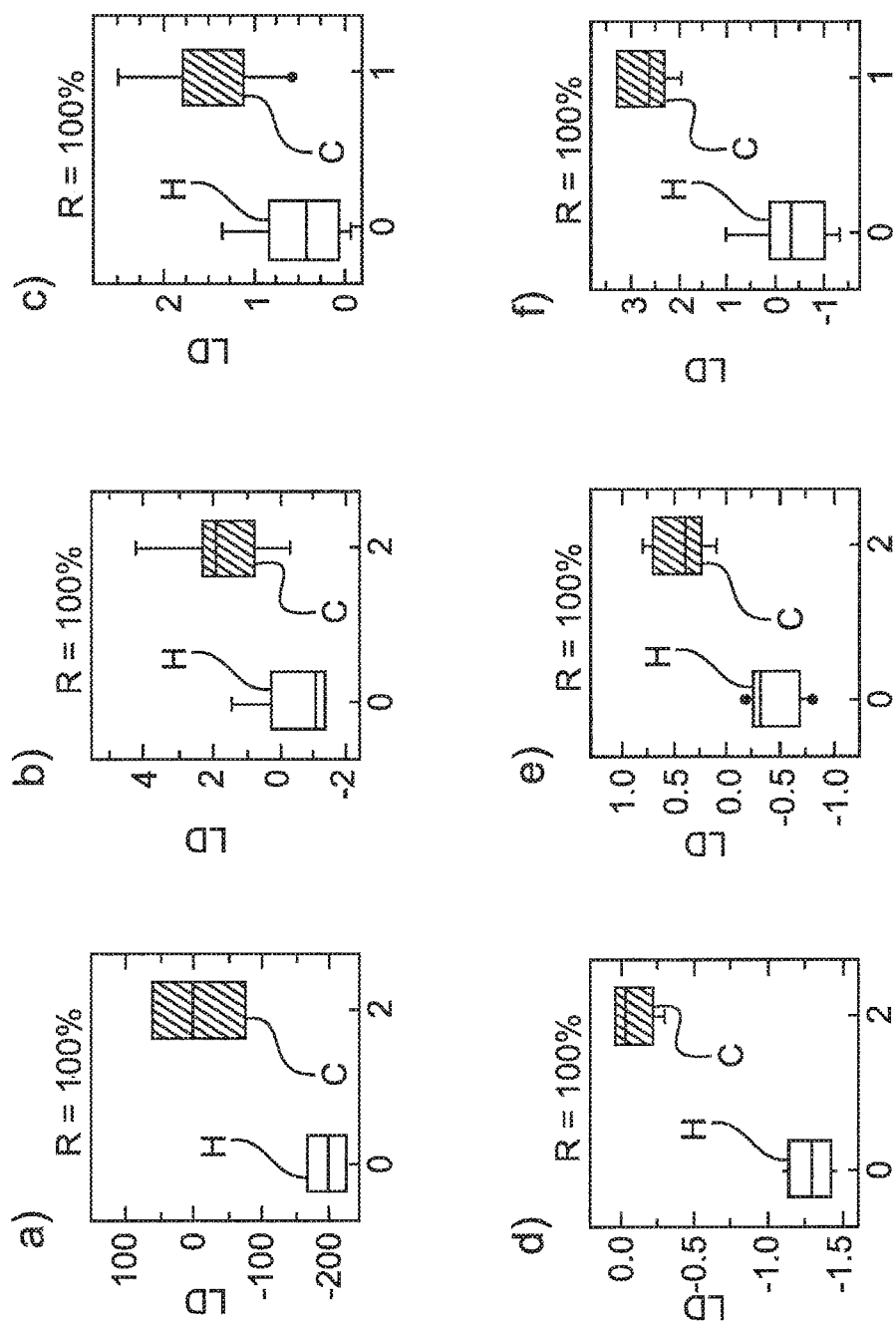
FIG. 7: Exemplary graphs for obtaining a conclusive discrimination between healthy samples H and altered samples C by aggregating multiple features in a linear discriminator LD.

FIG. 7 illustrates exemplary graphs of how the aggregation of multiple individual features 30-39 into a linear discriminant LD, 5 paves the way to a clear distinction between healthy samples H and altered samples C. The sub-figures a, b and c of FIG. 7 show examples for linear discriminators LD, 5 for an architecture index, for a chronicity index, and for an activity index, respectively, wherein only geometrical features 30-39 were used. The sub-figures d, e and f of FIG. 7 show examples for linear discriminators LD, 5, for an architecture index, for a chronicity index, and for an activity index, respectively, wherein the geometrical features 30-39 were complemented by CARS, TPEF and SHG intensity-related properties, IRP. In each sub-figure of FIG. 7, the accuracy of the discrimination between healthy samples H and cancerous samples C is labeled R.

A comparison of FIG. 7a with FIG. 6a reveals that the aggregation of multiple geometrical features 30-39 into a linear discriminator LD, 5 for an architecture index significantly widens the separation between the boxplots for healthy samples H and altered samples C. Both classes of samples can be discriminated from another with an accuracy R of 100%.

A comparison of FIG. 7b with FIG. 7b, and of FIG. 7c with FIG. 6c, reveals that the exemplary aggregation of features into linear discriminators LD, 5 for a chronicity index, resp. for an activity index, causes said separation between the boxplots for healthy samples H and altered samples C to appear. This separation had not been present in FIGS. 6b and 6c. Even rather simple linear discriminators LD, 5 produce fair accuracies R of 78% for discrimination based on the chronicity index, and 80% for discrimination based on the activity index.

Sub-FIGS. 7e to 7f reveal that the addition of intensity related properties causes said separations to widen even more, resulting in a perfect 100% discrimination between healthy samples H and altered samples C.

The labeling of the horizontal axes in FIG. 7 is the same as in FIG. 6.

EXEMPLARY LIST OF REFERENCE SIGNS 1 sample
2 image of sample 1
3 set of features 30-39
5 discriminant value
6 property
7 threshold for discriminant value 5
8 additional physical measurement data
11-19 training samples
20 processed version of image 2
21-29 images of training samples 11-19
30-39 features
40-49 pronunciation indices of features 30-39
50-59 weights of features 30-39
61-69 reference information on training samples 11-19
91 benign and healthy tissue
92 malignant tissue
93 benign but inflamed tissue
94 background area
97 cell nucleus
99a-99j correlation between pronunciation 40-49 and property 6
100 acquiring image 2 of sample 1
110 CARS signal
120 TPEF signal
130 SHG signal
150 selecting of area of interest
250 assigning of pronunciation index 40-49 to feature 30-39
300 computing of discriminant value 5
310 acquiring of reference information 61-69
320 computing of correlation 99a-99j
330 setting of weights 50-59
350 obtaining of weights 50-59
400 determining presence or absence of property 6 in sample 1
410 computing computationally stained version of image 2
500 marking of cell nucleus
600 identifying of red flag area RFA
700 acquiring of additional physical measurement data 8
800 determining property 6 using additional data 8
A area
AOI area of interest
C altered training sample 11-19
d equivalent diameter
FDR Fischer's discriminant ratio
H healthy training sample 11-19
LD linear discriminant
LDA linear discriminant analysis
IRP intensity-related property
PCA principal component analysis
PLS partial least squares regression
R accuracy of discrimination
RFA red flag area

The invention claimed is:
1. A method for determining the presence or absence of at least one property that is at least one of a local property or a global property of a biological tissue sample, comprising:
obtaining at least one image of the sample;
searching the at least one image for a presence of at least one particular feature that is contained in a pre-defined set of features;
assigning, to the at least one particular feature, a corresponding pronunciation index that is a measure of how pronounced the at least one particular feature is in at least one part of the image;
computing, with a computer processor, at least one discriminant value that is a function of the pronunciation index that is weighted with a particular weight, wherein the weight of each of the pronunciation index is a measure for a relevance of the at least one feature with respect to the at least one property;

determining whether the at least one property is present or absent in at least one part of the biological tissue sample depending on whether the discriminant value exceeds at least one of a pre-defined threshold or and optimized threshold, wherein the at least one property includes a presence of a specific structure in a specific place in the biological tissue sample;

in response to the determining that the specific structure is present in a specific place, marking the specific structure in the specific place in at least one of (i) the image, or (ii) a processed version of the image; and computing an appearance of the biological tissue sample that would result from an exposure of the biological tissue sample to at least one staining agent as the processed version of the image, wherein the image is a multimodal combination of at least two of a coherent anti-stokes Raman scattering (CARS) image, a two-photon excited auto fluorescence (TPEF) image, and a second-harmonic generation (SHG) image, and/or a stimulated Raman spectroscopy (SRS) image, and wherein at least one of a pre-set partial least squares regression model (PLS) or a linear discriminant analysis (LDA) is employed in the computing of the processed version of the image.

2. The method according to claim 1, wherein the at least one discriminant value includes a linear discriminant value.

3. A method for determining the presence or absence of at least one property that is at least one of a local property or a global property of a biological tissue sample, comprising:

obtaining at least one image of the sample;

searching the at least one image for a presence of at least one particular feature that is contained in a pre-defined set of features;

assigning, to the at least one particular feature, a corresponding pronunciation index that is a measure of how pronounced the at least one particular feature is in at least one part of the image;

computing, with a computer processor, at least one discriminant value that is a function of the pronunciation index that is weighted with a particular weight, wherein the weight of each of the pronunciation index is a measure for a relevance of the at least one feature with respect to the at least one property; and determining whether the at least one property is present or absent in at least one part of the biological tissue sample depending on whether the discriminant value exceeds at least one of a pre-defined threshold or and optimized threshold, wherein the image is a multimodal combination of at least two of a coherent anti-stokes Raman scattering (CARS) image, a two-photon excited auto fluorescence (TPEF) image, and a second-harmonic generation (SHG) image, and/or a stimulated Raman spectroscopy (SRS) image, and wherein the pre-defined set of features comprises at least one covariance between at least two of the CARS image, the TPEF image, the SHG image or the SRS image.

4. The method according to claim 3, wherein the pre-defined set of features comprises at least one of (i) at least one geometrical feature or (ii) at least one intensity related property (IRP).

5. The method according to claim 4, wherein the pre-defined set of features comprises at least one of:

an equivalent diameter of crypts,
a crypt area,
a CARS@2930 $cm^{-1}$ to TPEF@525 nm contrast of crypts,
a TPEF@525 nm mean of crypts,
a perimeter of crypts,
a crypt density,
a TPEF@458 nm smoothness of crypts,
a CARS@2850 $cm^{-1}$ 3rd moment of epithelium without crypts,
a TPEF@525 nm standard deviation of crypts,
a radius of crypts,
a CARS@2930 $cm^{-1}$ mean of epithelium without crypts,
a TPEF@458 nm standard deviation of crypts,
a TPEF@525 nm uniformity of crypts,
a CARS@2850 $cm^{-1}$ uniformity of epithelium without crypts,
a TPEF@525 nm mean of epithelium without crypts,
a CARS@2850 $cm^{-1}$ mean of epithelium without crypts,
A TPEF@525 nm 3rd moment of epithelium without crypts,
A CARS@2850 $cm^{-1}$ 3rd moment of crypts,
Histogram moments of certain areas for CARS, TPEF, SHG, or
Covariances between the modalities (CARS, TPEF, SHG) or similar properties.

6. The method according to claim 3, wherein the particular weight associated with the at least one feature is a measure for a correlation between a pronunciation of the at least one feature and a presence of the at least one property in at least one part of the sample.

7. The method according to claim 6, further comprising obtaining the particular weight associated with the at least one feature by:

acquiring a plurality of training images of training samples, searching the plurality of training images for a presence of the at least one feature, for each of the plurality of training images, computing a further pronunciation index that is a measure of how pronounced the at least one feature is in at least one part of a corresponding one of the training images, acquiring reference information indicating whether the at least one property is present in the plurality of training samples, computing a correlation between (i) a value of the further pronunciation index and (ii) presence or absence of the at least one property in at least one part of the training samples, and setting the particular weight to the value of the computed correlation.

8. The method according to claim 3, wherein the at least one property is a histological index, a malignancy grade or a tissue type.

9. A method for determining the presence or absence of at least one property that is at least one of a local property or a global property of a biological tissue sample, comprising:

obtaining at least one image of the sample;

searching the at least one image for a presence of at least one particular feature that is contained in a pre-defined set of features;

assigning, to the at least one particular feature, a corresponding pronunciation index that is a measure of how pronounced the at least one particular feature is in at least one part of the image;

computing, with a computer processor, at least one discriminant value that is a function of the pronunciation index that is weighted with a particular weight, wherein the weight of each of the pronunciation index is a measure for a relevance of the at least one feature with respect to the at least one property; and determining whether the at least one property is present or absent in at least one part of the biological tissue sample depending on whether the discriminant value exceeds at least one of a pre-defined threshold or and optimized threshold, wherein the image is a multimodal combination of at least two of a coherent anti-stokes Raman scattering (CARS) image, a two-photon excited auto fluorescence (TPEF) image, and a second-harmonic generation (SHG) image, and/or a stimulated Raman spectroscopy (SRS) image, and wherein at least one of (i) a ranking of the weights associated with the features corresponds to a ranking of Fisher's discriminant ratios (FDR) of the features with respect to a histological index as the at least one property, or (ii) the indices of the corresponding features are derived from the FDR.

10. The method according to claim 9, the at least one discriminant value is a measure for at least one of:
   a degree of crypt distortions,
   a degree of infiltration of lamina propria by lymphocytes and plasma cells,
   a presence of neutrophils within the lamina propria or within epithelial structures including the surface epithelium, the crypt epithelium and lumen,
   an unequivocal epithelial cell damage,
   a tissue type, or
   a malignancy degree.

11. The method according to claim 1, wherein the particular structure is a cell nucleus.

12. The method according to claim 1, wherein the at least one staining agent includes at least one of hematoxylin or eosin.

13. The method according to claim 3, further comprising:
   identifying a red flag area (RFA) on the biological tissue sample based on at least one of (i) an outcome of determining whether the property is present or absent, or (ii) the processed version of the image;
   acquiring additional physical measurement data within the RFA on the biological tissue sample; and
   determining whether a tested property is present or absent from the additional physical measurement data.

14. The method according to claim 13, wherein the acquiring of the additional physical measurement data comprises acquiring at least one Raman spectrum within the RFA on the biological tissue sample.

15. The method according to claim 14, wherein the determining regarding the tested property comprises performing a supervised statistical analysis of the additional physical measurement data.

16. The method according to claim 15, wherein the supervised statistical analysis comprises a principal component analysis (PCA).

17. The method according to claim 3, further comprising, after obtaining the at least one image, selecting an area of interest (AOI) for further processing of the image or for performing additional measurements.

18. A computer-accessible medium which stores a computer program thereon for determining the presence or absence of at least one property that is at least one of a local property or a global property of a biological tissue sample, wherein, when a computer processor executes the computer program, the processor is configured to perform procedures comprising:
   obtaining at least one image of the sample;
   searching the at least one image for a presence of at least one particular feature that is contained in a pre-defined set of features;
   assigning, to the at least one particular feature, a corresponding pronunciation index that is a measure of how pronounced the at least one particular feature is in at least one part of the image;
   computing, with a computer processor, at least one discriminant value that is a function of the pronunciation index that is weighted with a particular weight, wherein the weight of each of the pronunciation index is a measure for a relevance of the at least one feature with respect to the at least one property; and
   determining whether the at least one property is present or absent in at least one part of the biological tissue sample depending on whether the discriminant value exceeds at least one of a pre-defined threshold or and optimized threshold, wherein the at least one property includes a presence of a particular structure in a specific place in the biological tissue sample;
   in response to the determining whether the specific structure is present in the specific place, marking the specific structure in the specific place in at least one of (i) the image, or (ii) a processed version of the image; and
   computing an appearance of the biological tissue sample that would result from an exposure of the biological tissue sample to at least one staining agent as the processed version of the image,
   wherein the image is a multimodal combination of at least two of a coherent anti-stokes Raman scattering (CARS) image, a two-photon excited auto fluorescence (TPEF) image, and a second-harmonic generation (SHG) image, and/or a stimulated Raman spectroscopy (SRS) image, and
   wherein at least one of a pre-set partial least squares regression model (PLS) or a linear discriminant analysis (LDA) is employed in the computing of the processed version of the image.

19. A computer-accessible medium according to claim 18, wherein the particular structure is a cell nucleus.

20. A computer-accessible medium which stores a computer program thereon for determining the presence or absence of at least one property that is at least one of a local property or a global property of a biological tissue sample, wherein, when a computer processor executes the computer program, the processor is configured to perform procedures comprising:
   obtaining at least one image of the sample;
   searching the at least one image for a presence of at least one particular feature that is contained in a pre-defined set of features;
   assigning, to the at least one particular feature, a corresponding pronunciation index that is a measure of how pronounced the at least one particular feature is in at least one part of the image;
   computing, with a computer processor, at least one discriminant value that is a function of the pronunciation index that is weighted with a particular weight, wherein the weight of each of the pronunciation index is a measure for a relevance of the at least one feature with respect to the at least one property; and
   determining whether the at least one property is present or absent in at least one part of the biological tissue sample depending on whether the discriminant value exceeds at least one of a pre-defined threshold or and optimized threshold, wherein the image is a multimodal combination of at least two of a coherent anti-stokes Raman scattering (CARS) image, a two-photon excited auto fluorescence (TPEF) image, and a second-harmonic generation (SHG) image, and/or a stimulated Raman spectroscopy (SRS) image, and wherein the pre-defined set of features comprises at least one covariance between at least two of the CARS image, the TPEF image, the SHG image or the SRS image.

21. A computer-accessible medium which stores a computer program thereon for determining the presence or absence of at least one property that is at least one of a local property or a global property of a biological tissue sample, wherein, when a computer processor executes the computer program, the processor is configured to perform procedures comprising:

obtaining at least one image of the sample;

searching the at least one image for a presence of at least one particular feature that is contained in a pre-defined set of features;

assigning, to the at least one particular feature, a corresponding pronunciation index that is a measure of how pronounced the at least one particular feature is in at least one part of the image;

computing, with a computer processor, at least one discriminant value that is a function of the pronunciation index that is weighted with a particular weight, wherein the weight of each of the pronunciation index is a measure for a relevance of the at least one feature with respect to the at least one property; and determining whether the at least one property is present or absent in at least one part of the biological tissue sample depending on whether the discriminant value exceeds at least one of a pre-defined threshold or and optimized threshold, wherein the image is a multimodal combination of at least two of a coherent anti-stokes Raman scattering (CARS) image, a two-photon excited auto fluorescence (TPEF) image, and a second-harmonic generation (SHG) image, and/or a stimulated Raman spectroscopy (SRS) image, and wherein at least one of (i) a ranking of the weights associated with the features corresponds to a ranking of Fisher's discriminant ratios (FDR) of the features with respect to a histological index as the at least one property, or (ii) the indices of the corresponding features are derived from the FDR.

* * * * *